United States Patent [19]
Barrett

[11] Patent Number: 5,483,149
[45] Date of Patent: Jan. 9, 1996

[54] RESISTIVE HEATING CONTROL SYSTEM AND METHOD THAT IS FUNCTIONAL OVER A WIDE SUPPLY VOLTAGE RANGE

[75] Inventor: Tony Barrett, Boise, Id.

[73] Assignee: Hewlett-Packard Company, Palo Alto, Calif.

[21] Appl. No.: 144,597

[22] Filed: Oct. 28, 1993

[51] Int. Cl.$^6$ ............................................. G05F 5/02
[52] U.S. Cl. .................. 323/300; 323/235; 323/319; 323/322
[58] Field of Search ........................... 323/299, 300, 323/235, 236, 237, 239, 241, 319, 320, 322, 324; 363/142, 143

[56] References Cited

U.S. PATENT DOCUMENTS

| | | | |
|---|---|---|---|
| 3,859,591 | 1/1975 | Saunders | 323/235 |
| 4,287,468 | 9/1981 | Sherman | 323/322 |
| 4,629,852 | 12/1986 | Andre | 323/236 X |
| 4,928,055 | 5/1990 | Kaieda et al. | 323/300 |
| 5,138,192 | 8/1992 | Hsu | 307/350 |
| 5,329,223 | 7/1994 | Riggio | 323/246 |

*Primary Examiner*—Peter S. Wong
*Assistant Examiner*—Adolf Berhane
*Attorney, Agent, or Firm*—Anthony J. Baca

[57] ABSTRACT

This present invention takes advantage of the understanding that the voltage rating associated with resistive heating element can be ignored over the common line voltage range, provided the power dissipation is controlled. This is accomplished by applying a fractional amount of power to a heating element from the power source. The method consists basically of determining, or estimating, a ratio of the amount to be applied to the amount of power available. A control signal is generated with a duty cycle approximately equal to that ratio. A zero crossing switch, under control of the control signal switches half cycles to the heating element. Thus, by applying a portion of the available half cycles to the heating element, the average power dissipation by the heating element can be controlled.

5 Claims, 4 Drawing Sheets

RESISTIVE HEATING CONTROL SYSTEM AND METHOD THAT IS FUNCTIONAL OVER A WIDE SUPPLY VOLTAGE RANGE

CROSS-REFERENCE TO RELATED APPLICATION

The present application is related to the following U.S. patent application being assigned to the same assignee, entitled: "POWER LINE SYNCHRONIZED ZERO-CROSSING SWITCHED CONTROL TECHNIQUE FOR REDUCING FLICKER WHILE CONTROLLING POWER IN AN APPARATUS", (Attorney Docket 1093370), incorporated by reference.

1. Technical Field

This invention relates generally to power control systems and more particular to a method and apparatus to control the amount of power dissipation in a resistive heating element.

2. Background of the Invention

Many applications require that the equipment work over a wide range of alternating voltages. Within the United States, the common power line voltage can range from 110 to 240 VAC. If a particular piece of equipment is to function in the US and other markets, the equipment must allow for the different operating voltages. Most equipment has solved this problem by providing a user activated switch from which the user selects the proper input voltage. Outside of the obvious problem of selecting the wrong setting and possible damaging the equipment, a switch arrangement presents other problems. Generally a switch arrangement implies that a transformer is used. The switch selects the appropriate primary windings on the transformer. By requiring a transformer, weight and bulk are increased and efficiency is decreased. The transformer, because of its plurality of windings, also adds additional cost.

Some modern equipment uses universal power supplies. These universal power supplies automatically output the proper internal voltages used by the equipment independent to the input voltage. Of course, even the universal power supplies have a fixed range of input voltage they can accept. The primary disadvantage with the universal power supplies is their cost and reduced efficiency. Efficiency becomes a problem when trying to convert a significant amount of power.

In the art of electrophotographic printing, for example, the print media must pass through a fusing system. In the fuser, the print media is pressed between a pressure roller and a heated roller. By applying heat and pressure, the image on the print media is melted and thereby fused to the print media. While the fuser roller may be heated in any manner, a lamp placed inside the fuser roller is the most common method. While the printer electronics and paper handling components can be powered by a universal power supply, the bulb is generally selected for the appropriate line voltage. Therefore, either a transformer is used to switch select the proper voltage for the bulb or two separate fuser systems are used, each with a relatively tight voltage range. Thus, the printer could not be made truly universal in power requirements.

Therefore, it is the objective of the present invention to provide a control system and fuser system that will allow the fuser system to operate over a wide alternating current supply voltage range.

SUMMARY OF THE INVENTION

This present invention takes advantage of the understanding that the voltage rating associated with commonly available resistive heating element can be ignored over the common line voltage range, provided the power dissipation is controlled. In order to accomplish the objective of the present invention, there is provided a method for applying a fractional amount of power to a heating element from an AC power source. The method consists basically of determining a ratio of the amount to be applied to the amount of power available. A control signal is generated with a duty cycle approximately equal to the ratio. A zero crossing switch, under control of the control signal switches half cycles to the heating element. Thus, by applying a portion of the available half cycles to the heating element, the average power dissipated by the heating element can be controlled.

DETAILED DESCRIPTION OF THE PREFERRED EMBODIMENTS

The present invention pulse width modulates the incoming AC power to control the amount of power the heating element dissipates. This arrangement takes advantage of the understanding that the voltage rating associated with commonly available resistive incandescent heating lamps can be ignored over the common AC line voltage range, provided the power dissipation is controlled. Thus, operating a lamp rated at 120 volts and 750 watts at 210 volts with a 33% duty cycle still produces 750 watts. Operating such heating devices at higher voltages with controlled power dissipation appears to have no ill effect on the devices and may even be beneficial to the lamp.

Figure 1:
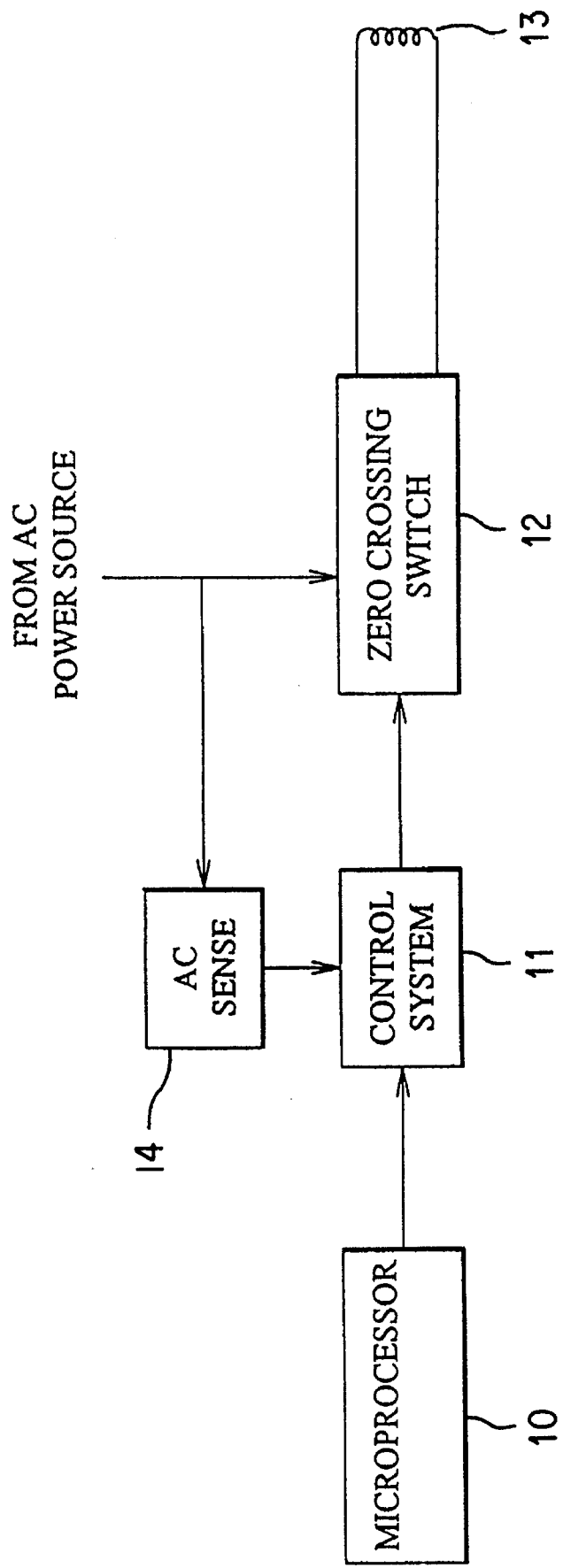
FIG. 1 is a block diagram of one embodiment in accordance with the present invention.

Referring first to FIG. 1, a first embodiment of the present invention is shown. Here, MICROPROCESSOR 10 supplies an on/off signal to CONTROL SYSTEM 11. CONTROL SYSTEM 11 in turn supplies the appropriate control signal to ZERO-CROSSING SWITCH (ZCS) 12. As shown, CONTROL SYSTEM 11 must know the approximate line voltage. With this information, CONTROL SYSTEM 11 can then modulate the control signal to ZCS 12 to control the amount of power to HEATING ELEMENT 13. ZERO-CROSSING SWITCH 12 ensures that the power to HEATING ELEMENT 13 is switched during a zero crossing of the input AC voltage. As is understood in the art, such switching reduces the electrical noise generated. A detailed description of the function of CONTROL SYSTEM 11 is provided in a subsequent paragraph.

Figure 2:
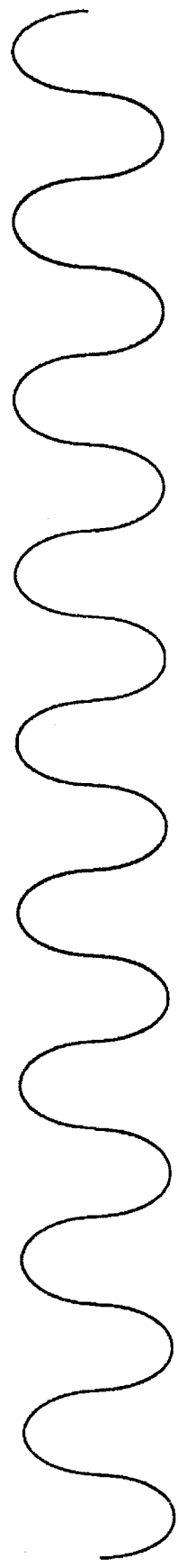
FIG. 2 shows a normal AC sinusoidal power signal.
Figure 3:
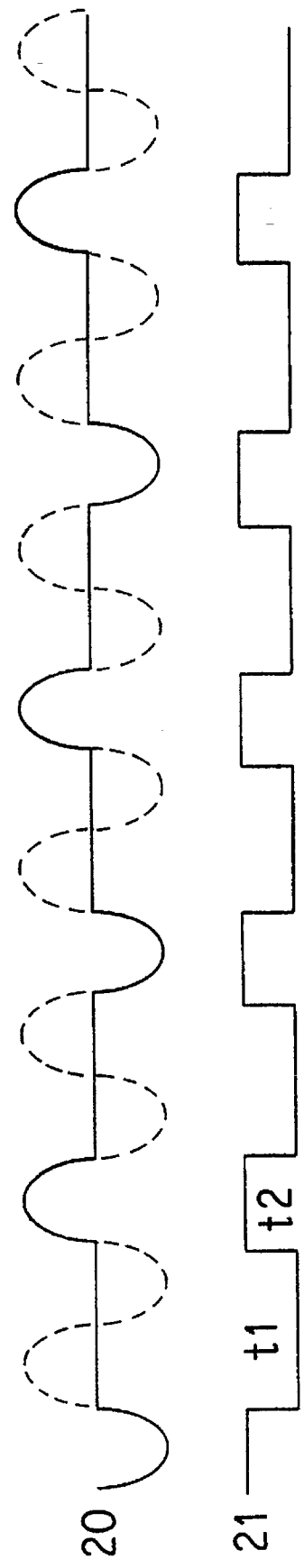
FIG. 3 shows the modified AC power signal after power control to reduce the power by approximately two-thirds.

Referring next to FIGS. 2 and 3, a detailed description of the function of the present invention is given. FIG. 2 shows a typical input AC power waveform, which is generally a sine wave. If the complete sine wave is applied to the heating element, then the power dissipation is a function of the voltage (V) of the input AC waveform and the resistance (R) of the heating element. Because heating elements' resistance (R) changes over time and temperature, actual resistance is a complex function. However, for simplification the following discussion uses a nominal steady state value of R. Thus if a given heating element is rated at P watts for V input voltage, it has a resistance R of:

$$R = \frac{V^2}{P} \quad \text{eqn. 1}$$

By way of an example, use a heating element rated at 750 watts at 120 VAC, then:

$$R = \frac{V^2}{P} = \frac{120^2}{750} \approx 19.2\Omega \quad \text{eqn. 2}$$

If the same amount of power is wanted with a voltage of 210 VAC, then:

$$R = \frac{V^2}{P} = \frac{210^2}{750} \approx 58.8\Omega \quad \text{eqn. 3}$$

On the other hand, if the 120 VAC heating element was used with the 210 VAC source, then the amount of power dissipated would be:

$$P = \frac{V^2}{R} = \frac{210^2}{19.2} \approx 2290W! \quad \text{eqn. 4}$$

It should be evident that the heating element would probably be destroyed or at least damaged if the wrong voltage were applied for any extended length of time. From equation 4, the ratio of desired power to actual power dissipation for the 120 VAC heating element with 210 VAC applied is approximately:

$$\frac{750}{2290} \approx \frac{1}{3} = 33\% \quad \text{eqn. 5}$$

or:

$$\left(\frac{V_1}{V_2}\right)^2 = \left(\frac{120}{210}\right)^2 \approx 0.33 = 33\% \quad \text{eqn. 6}$$

Thus, if the duty cycle of the 210 VAC is reduced to 33%, then the 120 VAC heating element will dissipate on average 750 W.

In FIG. 3, line 20 shows a sine wave with a 33% duty cycle. Note, the dotted lines represent those portions of the sine wave that is not applied to the heating element. Below the sine wave is the control signal 21 used to modulate the sine wave. As stated above, the present invention uses a zero crossing switch to reduce electrical noise. The use of such a switch is not necessary for the functionality of the present invention, however, with a zero crossing switch whenever the input sine wave crosses the zero voltage, the control signal is sampled. If the signal is high, then the switch is turned on for the next half cycle. If, on the other hand, the control is low, the switch is turned off for next half cycle. Therefore, when the control signal is high, the sine wave is applied to the heating element. Thus, by controlling the duty cycle of the control signal, the duty cycle of the applied voltage can also be controlled. In the present example, the control signal has a duty cycle (t1/t2) of approximately 33%.

As an alternative to using a ZCS, if the changes in the control signal are synchronized to zero crossing of the input power, a ZCS is not necessary. Such synchronization can easily be implemented by using a zero crossing detector to output a gating signal to gate the control signal. This synchronization could also be accomplished by detecting a zero crossing in the AC sense signal in real time and only toggling the control signal during those zero crossing times.

Continuing with the example, assuming that the waveform of FIG. 3 is applied to the heating element, then the heating element will dissipate 2290 W for 33% of the time and 0W for 66% of the time for an average of 750 W over time. As stated earlier, a heating element's resistance is a complex function. Through empirical testing it has been found that the resistance of the above heating element will increase slightly from the nominal value of 19.2.Ω. Therefore, it may be necessary to increase the duty cycle to produce the proper amount of power.

As seen in FIG. 1, AC SENSE 14 receives the power source signal and generates a signal that identifies the input power voltage level. Depending on the particular embodiment, the signal may be proportional to the input voltage, or in the alternative, may simply represent that the input voltage is within a given range. From this information, the CONTROL SYSTEM 11 can determine the present voltage and necessary duty cycle to provide the desired heating power.

CONTROL SYSTEM 11 can be arranged such that the AC SENSE signal selects the proper duty cycle from a limited number of selections. In the alternative, the AC SENSE signal could allow an infinite number of possible duty cycles. One embodiment of CONTROL SYSTEM 11 might be accomplished by using multivibrators. Other embodiments of the CONTROL SYSTEM 11 might include using a counter circuit to divide a clock signal from the MICROPROCESSOR 10 by a known factor to generated the desired control signal. Other detailed implementations of the CONTROL SYSTEM 11 can be made by one skilled in the art. The particular embodiment of the CONTROL SYSTEM 11 is not important to the present invention, provided that the embodiment performs the desired function.

Figure 4:
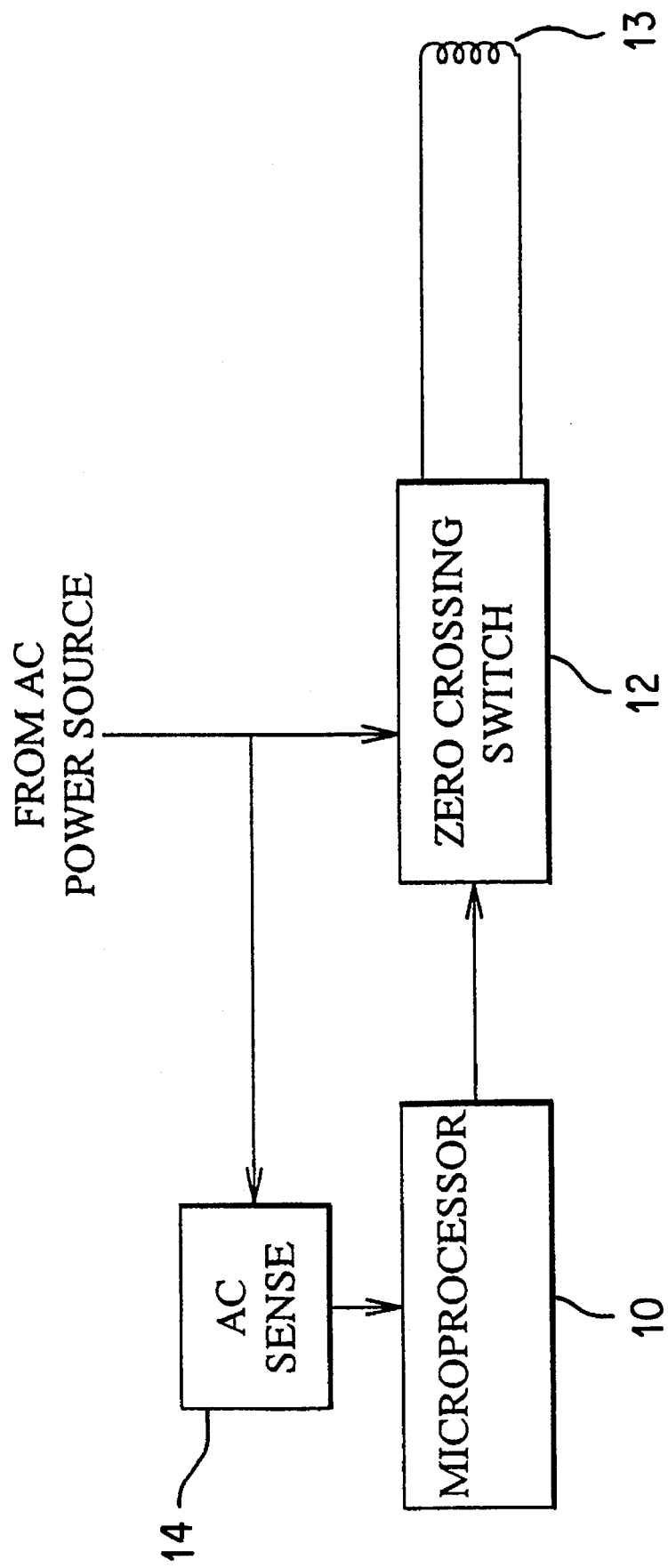
FIG. 4 is a block diagram of an alternative embodiment in accordance with the present invention.

FIG. 4 shows an alternative embodiment of the present invention. Here, MICROPROCESSOR 10 directly modulates the control signal to ZCS 12. This arrangement has several advantages. First, a reduced part count leading to higher efficiency and reliability and lower cost. Second, firmware in the MICROPROCESSOR 10 can easily include features such as soft start to prolong the life of HEATING ELEMENT 13 or rapid start to quickly bring the system up to operating temperature. With this arrangement, MICROPROCESSOR 10 can generate the modulation signal (21 of FIG. 3) directly. Additionally, with either arrangement of FIGS. 1 or 4, the MICROPROCESSOR 10 can turn off and on the HEATING ELEMENT 13 as needed. As stated above, this allows the system to reduce power when heat is not needed.

Figure 5:
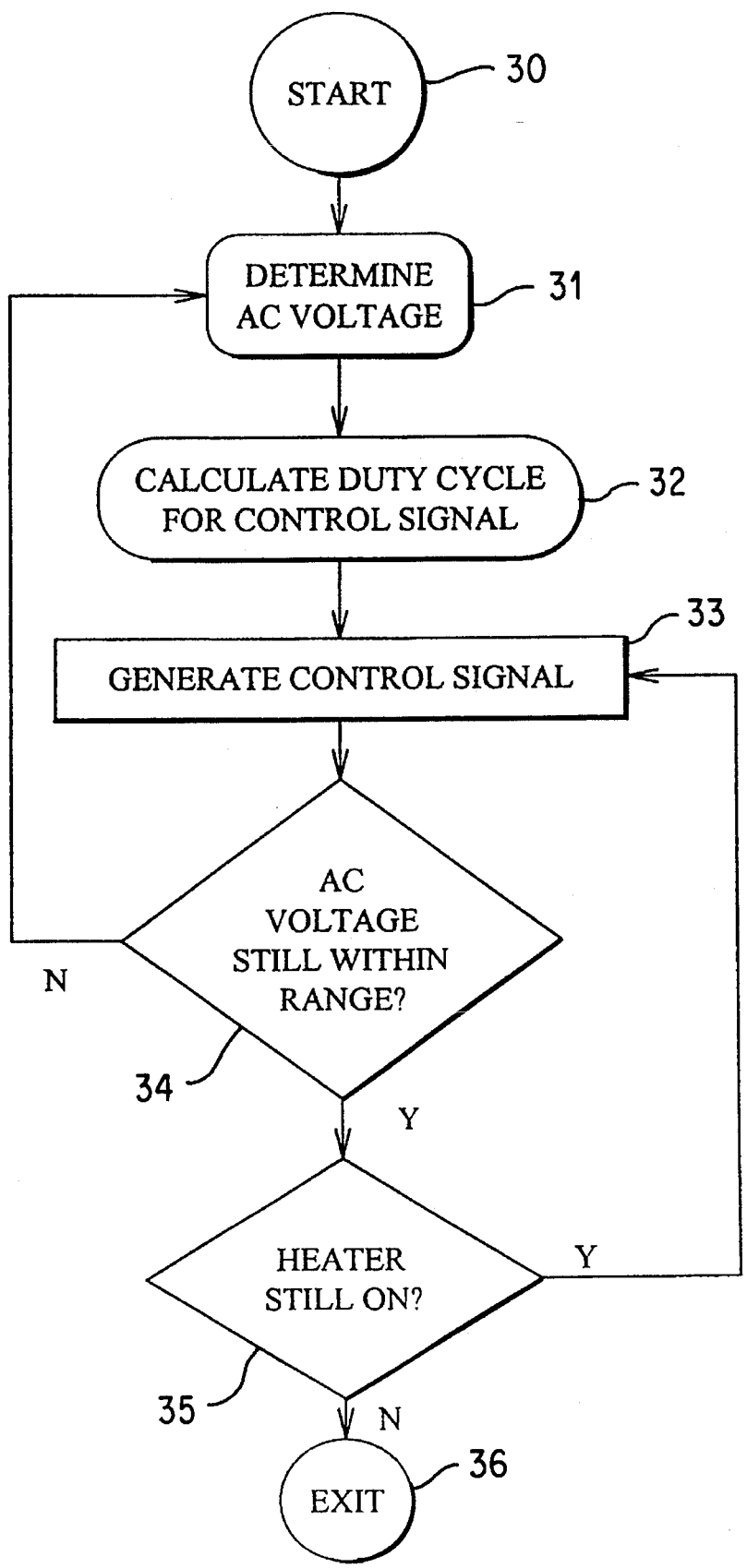
FIG. 5 is a flow diagram of logical steps implemented in accordance with the present invention.

Referring next to FIG. 5 where a logical flow diagram for MICROPROCESSOR 10 is shown. Once the master program of the system determines that the heater should be turned on, the steps of FIG. 5 are executed. Before the heater can be turned on, MICROPROCESSOR 10 must either first determine what the AC line voltage is 31 or make a first approximation. As stated above, MICROPROCESSOR 10 may either receive a signal that is proportional to the input voltage, or simply a finite number of discrete signals indicating that the voltage is within a given range. Independent of the sensing method, the duty cycle of the control signal must be determined 32. This step may be accomplished by having MICROPROCESSOR 10 actual calculating the duty cycle using equation 6 or in the alternative, a look-up table with pre-calculated duty cycles based on the input AC voltage could be used. A person skilled in the art could devise other methods of determining the duty cycle without undue experimentation.

After MICROPROCESSOR 10 has determined the duty cycle, the control signal with that duty cycle must be generated 33. As with step 32, step 33 can be implemented several ways. For example, MICROPROCESSOR 10 can be interrupted at regular intervals. During such intervals MICROPROCESSOR 10 determines if the control signal needs to be toggled and do so if needed. Another approach places the burden of counting and generating the signal in a hardware counter. Other arrangements are possible beyond the two described here. The description of these two are not meant to limit the step of 33 to only these two implementations.

While the control signal is generated, MICROPROCESSOR 10 should periodically recheck the AC voltage 34. If the voltage changes by a significant amount, the duty cycle may need to be re-calculated 32. MICROPROCESSOR 10 must also detect when the main system signals to turn the heater off 35 and do so. Other functions can be added to FIG. 5. For example, a temperature monitor used to signal MICROPROCESSOR 10 if the temperature of heater is within tolerances. Such a temperature sensing device placed near the HEATING ELEMENT 13, while not necessary for the operation of the present invention, may provide real-time information that the microprocessor can use to adjust the duty cycle for proper operating temperature. Information from the temperature sensing device may also indicate that the heating element is operating within certain safety constraints.

By using the already present microprocessor, pulse width, frequency and timing of the applied voltage can be optimized in real time. By such an arrangement, additional benefits such as soft-start, rapid warm-up, reduced flicker, and constant output can also be implemented.

As is understood in the art, a heating element is most likely to fail during the initial application of power to a cold element. The inrush current can be very high because the cold resistance of the heating element is much lower than the nominal operating resistance. A soft-start allows the heating element to slowly reach its operating temperature and nominal resistance. Thus, by slowing increasing the duty cycle of the control signal, the initial current inrush is controlled, thereby reducing the likelihood of premature failure of the heating element.

Similarly, once the heating element has reached operating resistance, the duty cycle can be increased above the nominal operating duty cycle for short periods. The increased duty cycle causes the heating element to output an increased amount of heat. By increasing the heat output of the heating element, the operating temperature can be reached faster. Assuming the thermal dynamics of the system are sufficient such that the operating temperature can be reached in a relatively short period of time, subjecting the heating element to the increased power dissipation for this short period of time will have no ill effect on the heating element. Thus, by temporarily increasing the duty cycle of the control signal, the heating system can rapidly reach its operating temperature.

As described in co-pending application "POWER LINE SYNCHRONIZED ZERO-CROSSING SWITCHED CONTROL TECHNIQUE FOR REDUCING FLICKER WHILE CONTROLLING POWER IN AN APPARATUS", (U.S. patent application Ser. No. 08/144,596 filed on Oct. 28, 1993), switching the heating element on and off at a relatively slow rate causes lights on the same circuit to flicker. A flicker rate of approximately 30 Hz or more is generally not perceived by the human eye. However, at rates less than 30 Hz, the human eye begins to notice a flicker. By combining the teaching of the co-pending application with the teaching taught here, the benefit of both inventions could be realized in a single circuit.

As with any system, failures can occur. Should MICROPROCESSOR 10 fail and the control signal to ZCS 12 be in the high state, HEATING ELEMENT 13 may overheat thereby causing a potential safety hazard. Thus some additional safety measures should be added. Some additions might include AC coupling the control signal to ZCS 12 such that if the signal is not periodically toggled, the signal to ZCS 12 becomes low thereby turning off ZCS 12. Other safety systems might include a thermal fuse or circuit breaker that disables power to the heater element if the temperature is above a preset level. It should be readily apparent that the present invention is compatible with many of these common safety systems. Numerous other safety circuits are possible.

In summary, this present invention takes advantage of the understanding that the voltage rating associated with commonly available resistive heating element can be ignored over the common AC line voltage range, provided the power dissipation is controlled. Prior to the present invention, the MICROPROCESSOR 11 directly controlled the ZERO-CROSSING SWITCH (ZCS) 12 with no knowledge of the input AC voltage. With the present invention, CONTROL SYSTEM 11 is placed between MICROPROCESSOR 10 and ZCS 12 or MICROPROCESSOR 10 is provided with information about the input AC voltage. Based on the detected AC voltage, the control signal to ZCS 12 is modulated such that the heater element dissipates the same amount of heat independent of the AC line voltage. This enables a heating element designed to operate at a specific AC voltage to operate at greater voltages while still dissipating the correct amount of power.

While the above description describes the present invention receiving power from an AC source, the present invention is not intended to be so limited. Thus, the present invention can function as well using a DC source. Some minor modifications may be necessary for proper operation from a DC source. For example, a ZCS can not be used when a DC source is used.

Although the preferred embodiment of the invention has been illustrated, and that form described, it is readily apparent to those skilled in the art that various modifications may be made therein without departing from the spirit of the invention or from the scope of the appended claims.

What is claimed is:

1. An apparatus for regulating an amount of power a heating element consumes, said heating element being designed to operate at a first RMS voltage, said apparatus comprising of:

a main power supply generating an output voltage, said output voltage having an RMS value between said first RMS voltage and a second RMS voltage, said first RMS voltage being less than said second RMS voltage, said output voltage from said main power supply being periodically varying;

zero crossing detector for detecting a zero crossing of said output voltage where said zero crossing occurs between positive and negative half cycles of said output voltage;

signal generator means for generating a control signal, said control signal having a first state and a second state, a ratio of said first state and said second state being a function of said first RMS voltage and said output voltage, said signal generator means changing said control signal between said first state and said second state only when said zero crossing detector detects said zero crossing; and switch arranged to receive said control signal from said signal generator means, said switch connecting said output voltage from said main power supply to said heating element when said control signal is in said first state.

2. An apparatus as claimed in claim 1 wherein said signal generator means further comprising voltage sensing means for sensing said output voltage and generating a voltage level signal that is proportional to said output voltage, said generator means using said voltage level signal to determine said ratio.

3. An apparatus as claimed in claim 2 wherein said signal generator means is a microcomputer arranged to receive said voltage level signal, as a function of said voltage level signal, said microcomputer determines said ratio and based on said ratio, said microcomputer generates said control signal with said ratio.

4. A method for regulating a first amount of power consumed by a heating element said method comprising the steps of:

receiving output power from a main power supply, said output power being between said first amount of power and a second amount of power, said second amount of power being greater than said first amount of power, said main power supply generating an output voltage, said output voltage from said main power supply being periodically varying;

determining a ratio of said first amount of power to said output power;

generating a control signal, said control signal having a first state and a second state, a duty cycle of said first state and said second state being a function of said ratio;

detecting a zero crossing of said output voltage of said main power supply where said zero crossing occurs between positive and negative half cycles of said output voltage; and allowing said output power to flow from said main power supply to said heating element when said control signal is in said first state and said step of detecting detects said zero crossing, said step of allowing interrupts said output power flow from said main power supply to said heating element when said control signal is in said second state and said step of detecting detects said zero crossing.

5. A method for regulating power consumed by a heating element, said method comprising the steps of:

receiving an output voltage from a main power supply, said output voltage having an RMS value between a first RMS voltage and a second RMS voltage, said second RMS voltage being greater than said first RMS voltage, said output voltage from said main power supply being periodically varying;

determining a ratio of said first RMS voltage to said output voltage;

generating a control signal having a first state and a second state, a duty cycle of said first state and said second state being a function of said ratio;

detecting a zero crossing of said output voltage where said zero crossing occurs between positive and negative half cycles of said output voltages; and connecting said main power supply to said heating element when said control signal is in said first state and said step of detecting detects said zero crossing, said step of connecting disconnects said main power supply from said heating element when said control signal is in said second state and said step of detecting detects said zero crossing.

* * * * *